US009912377B2

(12) United States Patent
Nilsson et al.

(10) Patent No.: US 9,912,377 B2
(45) Date of Patent: Mar. 6, 2018

(54) ARRANGEMENT COMPRISING A NETWORK NODE AND LEAKY CABLE

(71) Applicant: Telefonaktiebolaget LM Ericsson (publ), Stockholm (SE)

(72) Inventors: Andreas Nilsson, Göteborg (SE); Jonas Medbo, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 5 days.

(21) Appl. No.: 15/103,716

(22) PCT Filed: Dec. 13, 2013

(86) PCT No.: PCT/EP2013/076543
§ 371 (c)(1),
(2) Date: Jun. 10, 2016

(87) PCT Pub. No.: WO2015/086091
PCT Pub. Date: Jun. 18, 2015

(65) Prior Publication Data
US 2016/0323018 A1 Nov. 3, 2016

(51) Int. Cl.
*H04B 7/04* (2017.01)
*H04B 5/00* (2006.01)
(Continued)

(52) U.S. Cl.
CPC .......... *H04B 5/0018* (2013.01); *H01Q 1/007* (2013.01); *H01Q 13/203* (2013.01);
(Continued)

(58) Field of Classification Search
CPC ........ H01Q 1/00; H01Q 13/20; H01Q 13/203; H01Q 1/007; H04B 5/00; H04B 7/04;
(Continued)

(56) References Cited

U.S. PATENT DOCUMENTS 4,091,367 A * 5/1978 Harman ............. G08B 13/2497
333/237
4,339,733 A * 7/1982 Smith .................. H01Q 13/203
333/237
(Continued)

FOREIGN PATENT DOCUMENTS

WO   WO 2010017180 A1 *   2/2010 ............... H04B 3/36
WO   WO 2011162917 A2 * 12/2011 ............. H01Q 1/007
(Continued)

OTHER PUBLICATIONS

International Search Report issued in International application No. PCT/EP2013/076543 dated Aug. 21, 2014, 3 pages.
(Continued)

*Primary Examiner* — Daniel Washburn
*Assistant Examiner* — Berhanu Tadese
(74) *Attorney, Agent, or Firm* — Rothwell, Figg, Ernst & Manbeck, p.c.

(57) ABSTRACT

The disclosure relates to an arrangement 100; 200 comprising a network node 3 and one or more leaky cables 2 connected at a first end 6 thereof to a respective antenna port of a first set of antenna ports of the network node 3. The network node 3 is configured to provide wireless communication for a communication device 4. The arrangement 10 comprises: a first multiplexing device 8; 10 connected to antenna ports of a second set of antenna ports of the network node 3; a second multiplexing device 9; 11 connected to the one or more leaky cables 2 at a second end 7 thereof; an interconnecting cable 5, interconnecting the first multiplexing device 8; 10 and the second multiplexing device 9; 11, wherein the first multiplexing device 8; 10 is arranged to frequency convert signals received from the second set of antenna ports and multiplex them into the interconnecting cable 5, and arranged to demultiplex signals received from the interconnecting cable 5 and to frequency convert signals
(Continued)

for processing by the network node 3, and wherein the second multiplexing device 9; 1 is arranged to frequency convert signals received on the one or more leaky cables 21 and multiplex them into the interconnecting cable 5, and arranged to demultiplex signals received from the interconnecting cable 5 and to frequency convert signals for transmission on the one or more leaky cables 2.

8 Claims, 3 Drawing Sheets

(51) Int. Cl.
| | | |
|---|---|---|
| H01Q 1/00 | (2006.01) | |
| H01Q 13/20 | (2006.01) | |
| H04B 7/0413 | (2017.01) | |
| H04W 72/04 | (2009.01) | |

(52) U.S. Cl.
CPC ........ *H04B 7/0413* (2013.01); *H04W 72/042* (2013.01); *H04W 72/0413* (2013.01)

(58) Field of Classification Search
CPC . H04B 5/0018; H04B 7/0413; H04W 72/042; H04W 72/0413
USPC .......................................................... 375/257
See application file for complete search history.

(56) References Cited

U.S. PATENT DOCUMENTS

| | | | | | |
|---|---|---|---|---|---|
| 5,005,183 | A | * | 4/1991 | Carey | ...................... H04B 1/69 375/130 |
| 5,247,270 | A | * | 9/1993 | Harman | ............... H01Q 13/203 174/36 |
| 5,465,395 | A | * | 11/1995 | Bartram | ............... H01Q 13/203 333/237 |
| 5,586,167 | A | * | 12/1996 | Handforth | ................ H04B 7/26 455/410 |
| 6,337,754 | B1 | * | 1/2002 | Imajo | ............... H04B 10/25752 398/115 |
| 7,009,573 | B2 | * | 3/2006 | Hornsby | ............ H04B 7/15571 343/727 |
| 2003/0045284 | A1 | * | 3/2003 | Copley | ............... H04W 88/085 455/426.1 |
| 2004/0219930 | A1 | * | 11/2004 | Lin | ....................... H04W 64/00 455/456.1 |
| 2006/0019603 | A1 | * | 1/2006 | Pergal | ................ H04B 7/15542 455/15 |
| 2009/0061939 | A1 | * | 3/2009 | Andersson | ............. H04B 7/082 455/562.1 |
| 2011/0234338 | A1 | * | 9/2011 | Takahashi | ........... H01Q 13/203 333/237 |
| 2012/0306711 | A1 | * | 12/2012 | Asplund | ............. H01Q 13/203 343/776 |
| 2013/0162500 | A1 | * | 6/2013 | Coldrey | ................. H01Q 1/007 343/904 |
| 2013/0188753 | A1 | * | 7/2013 | Tarlazzi | ................ H04B 7/024 375/299 |
| 2013/0257669 | A1 | * | 10/2013 | Asplund | ................ H01Q 1/007 343/771 |
| 2015/0147960 | A1 | * | 5/2015 | Hanson | ............. H04B 7/15528 455/23 |

FOREIGN PATENT DOCUMENTS

| | | | | |
|---|---|---|---|---|
| WO | WO 2013017175 A1 | * | 2/2013 | ........... H04B 5/0018 |
| WO | 2013/091717 A1 | | 6/2013 | |
| WO | WO 2013112083 A1 | * | 8/2013 | ............ H04W 48/18 |
| WO | WO 2013149643 A1 | * | 10/2013 | ........... H01Q 13/203 |

OTHER PUBLICATIONS

International Preliminary Report on Patentability issued in International application No. PCT/EP2013/076543 dated Jun. 14, 2016, 5 pages.

\* cited by examiner

ARRANGEMENT COMPRISING A NETWORK NODE AND LEAKY CABLE

CROSS-REFERENCE TO RELATED APPLICATIONS

This application is a 35 U.S.C. § 371 National Phase Entry Application from PCT/EP2013/076543, filed Dec. 13, 2013, designating the United States, the disclosure of which is incorporated by reference.

TECHNICAL FIELD

The technology disclosed herein relates generally to the field of wireless communication systems, and in particular to use of leaky cables in multiple-input-multiple-output deployment.

BACKGROUND

A large part of the traffic load in future wireless communication systems is expected to originate from indoor users, for example from users in office buildings, cafés, shopping malls etc. Providing the indoor users with high bit-rate and spectrally efficient communication from outdoor base stations is challenging due to the penetration loss that is experienced by signals propagating through building walls. One well known solution for enhancing the indoor coverage is to use outdoor-to-indoor repeaters. An outdoor-to-indoor repeater has a pick-up antenna on the outside of the building connected via a double-directional power amplifier to a donor antenna on the inside of the building. Another well known solution is to deploy pure indoor systems for example by deploying an indoor radio base station (RBS) and connect it to a distributed antenna system (DAS) where the antennas are also located indoors and close to the users. An alternative to using DAS is to use leaky (coaxial) cables. Typical use cases for leaky cables are indoor deployments and along railway tunnels. Put simply, a leaky cable is a coaxial cable with slots or gaps along its entire length which enable the cable to "leak" electromagnetic waves. The leaky cable exhibits radiation properties different to a DAS, such as for example having more uniform signal levels over the coverage area. A leaky cable can be used both for transmitting and receiving electromagnetic waves, i.e. it allows two-way communication.

Leaky cables are relatively expensive and complicated to install due to their weight and stiff profile. In multi-stream applications such as multiple-input multiple-output (MIMO) communications multiple cables, in particular one leaky cable for each stream, need to be installed more or less in parallel which complicates the installation even more. MIMO communications are typically applicable indoors where high bit rates are sought after, as indoor areas are often rich scattering environments suitable for MIMO. A standard leaky cable leaks energy along its entire length and it has a large attenuation per meter which means that the Signal to Noise ratio (SNR) experienced by a user device located close to the end of the leaky cable is much less than for a user device located at the beginning of the leaky cable, at which end the leaky cable is fed. This leads to a very skew capacity distribution along the leaky cable which is much undesired. One way to combat this skewness is to introduce multiple Radio Frequency (RF) amplifiers or repeaters along the leaky cable that can amplify the signal propagating through the leaky cable. A drawback is that such a solution is expensive and that power sources at each installation point are needed, which again complicates the installation and increases the cost. Another way to combat the skewness is to equalize the power radiated per length unit by increasing the number of perforations towards the end of the leaky cable.

Leaky cables are often used to cover long areas such as tunnels, corridors etc. For deployment of higher order MIMO, several leaky cables have to be installed in parallel which is costly. For instance, for 8×8 MIMO, eight leaky cables have to be installed through the entire length of the area. As mentioned, these leaky cables are very costly as well as hard to install and the above described difficulty of maintaining the same capacity over the entire length of the leaky cable is also encountered.

Patent publication US 2013/0162500 describes the connecting of two antenna ports of a network node to a single leaky cable, thereby achieving improvements for 2×2 MIMO deployment. For instance, the teachings therein provide a more evenly distributed capacity along the cable and also enable reduction of the number of required cables for a given MIMO order. Although providing a well-functioning solution advantageously applied for circular coverage areas, such solution is not equally well suited for parallel leaky cable deployments, e.g. in straight long corridors or long tunnels for the above mentioned reasons. For example, implementing a solution according to the mentioned publication in a corridor would give no improvement e.g. in view of cable length; although four cables could be used for the 8×8 MIMO example, the total length would still be the length of 8 cables following the corridor to one end and then back again.

SUMMARY

An object of the present teachings is to solve or at least alleviate at least one of the above mentioned problems.

The object is according to an aspect achieved by an arrangement comprising a network node and one or more leaky cables connected at a first end thereof to a respective antenna port of a first set of antenna ports of the network node. The network node is configured to provide wireless communication for a communication device. The arrangement further comprises: a first multiplexing device connected to antenna ports of a second set of antenna ports of the network node; a second multiplexing device connected to the one or more leaky cables at a second end thereof; an interconnecting cable, interconnecting the first multiplexing device and the second multiplexing device, wherein:

the first multiplexing device is arranged to frequency convert signals received from the second set of antenna ports and multiplex them into the interconnecting cable, and arranged to demultiplex signals received from the interconnecting cable and to frequency convert signals for processing by the network node, and wherein the second multiplexing device is arranged to frequency convert signals received on the one or more leaky cables and multiplex them into the interconnecting cable, and arranged to demultiplex signals received from the interconnecting cable and to frequency convert signals for transmission on the one or more leaky cables.

An advantage provided by the arrangement is the reduced number of leaky cables needed when deploying leaky cable systems with MIMO order greater then 2. Another advantage is that the capacity becomes more evenly distributed along the coverage area.

Further features and advantages of the present disclosure will become clear upon reading the following description and the accompanying drawings.

DETAILED DESCRIPTION

Figure 1:
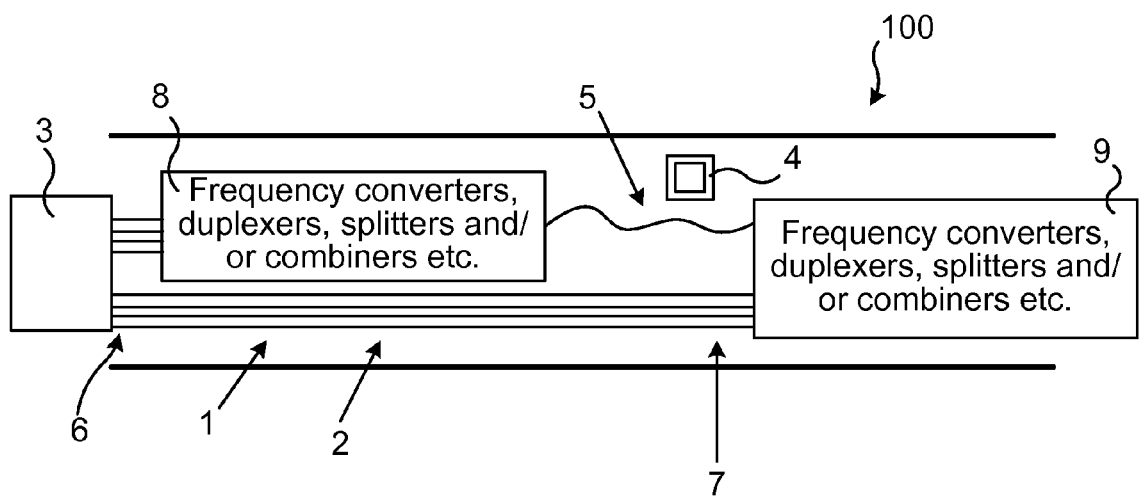
FIG. 1 illustrates a first embodiment of the present disclosure.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

A leaky cable has two ends, wherein one end conventionally is connected to a network node and used to feed/sense the cable whereas the other end is terminated or left open. The earlier mentioned patent publication US 2013/0162500 provides improvements e.g. by making use of both ends of the leaky cable by connecting the ends to a respective antenna port. The present disclosure also makes use of both ends of the leaky cable by feeding and/or sensing the leaky cable in both ends. However, the present disclosure is adapted for use particularly in environments covering long areas, e.g. tunnels or corridors, rather than circular areas. In such environment, the end of the leaky cable is typically located far away from a network node. As mentioned in the background section, implementing a solution according to the mentioned publication in this environment would give no improvement in view of cable length.

Briefly, when installing the leaky cables to provide communication coverage over a long area, the signals are fed/sensed in the far end of the leaky cable and are, in various embodiments, transported to/from the network node by means of a single cable, for example a coaxial cable. By using frequency converters, splitters and duplexers only one coaxial cable has to be used to transport all signals between the network node and the far ends of the leaky cables. A saving in terms of cable length is then, for the 8×8 MIMO case, the length of three cables. That is, instead of using one leaky cable for each stream of the MIMO deployment, four leaky cables is sufficient for all eight channels, and an extra cable for transporting four signals from the rear ends of the leaky cables to the network node.

FIG. 1 illustrates a first embodiment of the present teachings. One or more leaky cables 2, four in the illustrated case, are installed in an area such as a tunnel or corridor 1. It is noted that while the present disclosure could be implemented for a single leaky cable, the gain in terms of e.g. cable length would not be obtained. The leaky cables 2 are at one end thereof connected to a network node 3 configured to provide wireless communication to one or more communication devices 4. The network node 3 may for example comprise a radio base station. When feeding the leaky cable 2, signals are transmitted through the leaky cables 2 and may be received by communication devices 4 located within coverage area of the network node 3. When sensing the leaky cable 2, signals are received by means of the leaky cables 2 from communication devices 4.

FIG. 1 thus exemplifies aspects of the present disclosure by an 8×8 MIMO system deployed in the corridor 1, for which four leaky cables 2 are used. A first end 6 of each leaky cable 2 is connected to the network node 3, and in particular to a respective antenna port of the network node 3 or controlled by the network node 3. In order to enable each leaky cable 2 to transmit and receive signals in both ends thereof, the opposite end of each leaky cable 2, denoted far end or second end herein, also has to be fed/sensed. In this embodiment a coaxial cable 5 is used for this purpose, i.e. to transport the signals between the four far ends, indicated at reference numeral 7, of the four leaky cables 2 and the network node 3. By using frequency converters and duplexers, all four streams may be transported within the same coaxial cable 5. It is noted that other types of cables could be used for this purpose, for example leaky cable, cupper cable, Ethernet cable etc.

The feeding of signals (i.e. downlink) to the leaky cables 2 at their first ends 6 from a first set of antenna ports can be made in conventional manner, as can the sensing of signals (i.e. uplink) for the first set of antenna ports. That is, a communication device 4 located in the corridor may be configured to communicate over one or more wireless channels by means of the leaky cables 2 and the network node 3. The communication device 4 may be configured to handle MIMO communication, i.e. be able to receive and/or transmit several data streams (signals) spatially multiplexed onto a MIMO channel. An 8×8 MIMO configuration supports up to 8 spatial streams and antennas (n×m defining n transmit antennas and m receive antennas).

A first multiplexing device 8 is arranged within or close to the network node 3 and connected to a number of antenna ports of the network node 3. In the illustrated case, the first multiplexing device 8 is connected to four such antenna ports. The antenna ports to which the first multiplexing device 8 is connected are denoted second set of antenna ports in the following.

At the far ends 7 of the leaky cables 2, a second multiplexing device 9 is arranged, to which the far ends 7 of the leaky cables 2 are connected. The first multiplexing device 8 is interconnected with the second multiplexing device 9 by means of the cable 5. When feeding signals from the second set of antenna ports to the far ends 7 of the leaky cables 2 (i.e. downlink), the first multiplexing device 8 receives the signals and multiplexes them all over the single cable 5. The second multiplexing device 9 demultiplexes the signals and the far end of the leaky cables 2 are thereby fed the signals from the second set of antenna points. Correspondingly, when receiving, in the leaky cables 2 (i.e. uplink), signals for the second set of antenna ports, the second multiplexing device 9 multiplexes them all over the single cable 5. The first multiplexing device 8 then demultiplexes the signals and provides them to the network node 3.

Providing duplexers (not illustrated in FIG. 1) connected between the second set of antenna ports and the first multiplexing device 8 and providing duplexers connected between the far ends 7 of the leaky cables 2 and the second multiplexing device 9, enables bi-directional (duplex) communication over the single cable 5, i.e. uplink and downlink simultaneously.

In this first embodiment, active components are used at the far end 7 of the leaky cables 2 and a monitoring system needs to be deployed that keeps track of these active components. Such active components comprise e.g. active frequency converters and local oscillators that are used for performing the required signal processing (e.g. frequency conversions from frequency of originally sent/received signal to frequency of signal for transmission over the interconnecting cable 5, and the corresponding reverse frequency conversions for transmission on leaky cables 2/reception in network node 3).

The attenuation for a coaxial cable increases with frequency. Therefore, in one embodiment in which the cable 5 is a coaxial cable, as low frequency as possible is used in the cable 5 in order to minimize losses. For example, the attenuation loss of a typical coaxial cable shows that for 150 MHz the loss is about 0.8 dB/loom while for 2.4 GHz the loss is about 5.5 dB/100 m. To combat this, a bi-directional amplifier (not illustrated) is used according to one embodiment, to increase the signal at the far ends 7 of the leaky cables 2.

Figure 2:
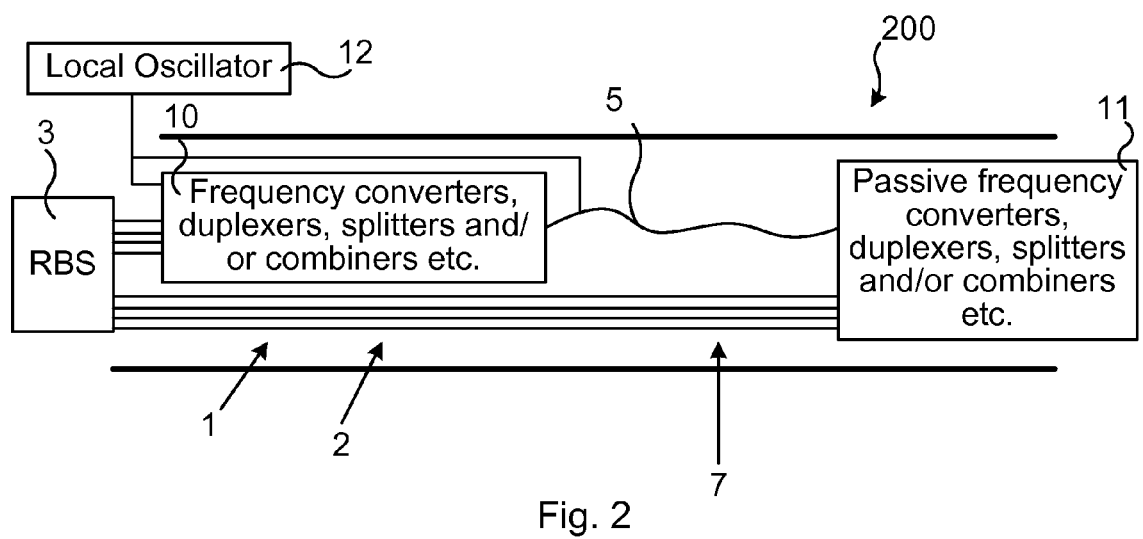
FIG. 2 illustrates a second embodiment of the present disclosure.

FIG. 2 illustrates a second embodiment of the present disclosure, again for an 8×8 MIMO system deployed in a corridor 1. This embodiment is thus similar to the one described in FIG. 1 except that here passive frequency converters are used at the far ends 7 of the leaky cables 2. In the illustrated example the cable 5 is again used to transport the signals between the network node 3 (and in particular the antenna ports thereof) and the far ends 7 of the four leaky cables 2, as has been described in relation to FIG. 1.

Similar to the first and second multiplexing devices 8, 9 described in relation to FIG. 1, also this embodiment uses a first multiplexing device 10 and a second multiplexing device 11. These first and second multiplexing devices 10, 11 are arranged to perform the same tasks as the first and second multiplexing devices 8, 9 described earlier.

However, in this embodiment, passive frequency converters are used at the far end 7 of the leaky cables 2. A local oscillator (LO)-signal may be generated in the network node 3, and transferred to the passive frequency converters at the far ends 7 of the leaky cables 2 through the cable 5. At the network node 3 side either passive or active frequency converters may be used.

The LO-signal is used by the passive frequency converters to perform the frequency conversions needed (as described earlier).

The use of passive frequency converters at the far ends 7 of the leaky cables 2 in turn enables the use of only passive components in the multiplexing device 11 at the far end 7 of the leaky cables 2. Only passive components thus need to be used at the far ends 7 of the leaky cables 2 and this removes the need for a monitoring system at the far ends of the leaky cables 2, which provides a more cost efficient solution in view of installation and maintenance.

Figure 3:
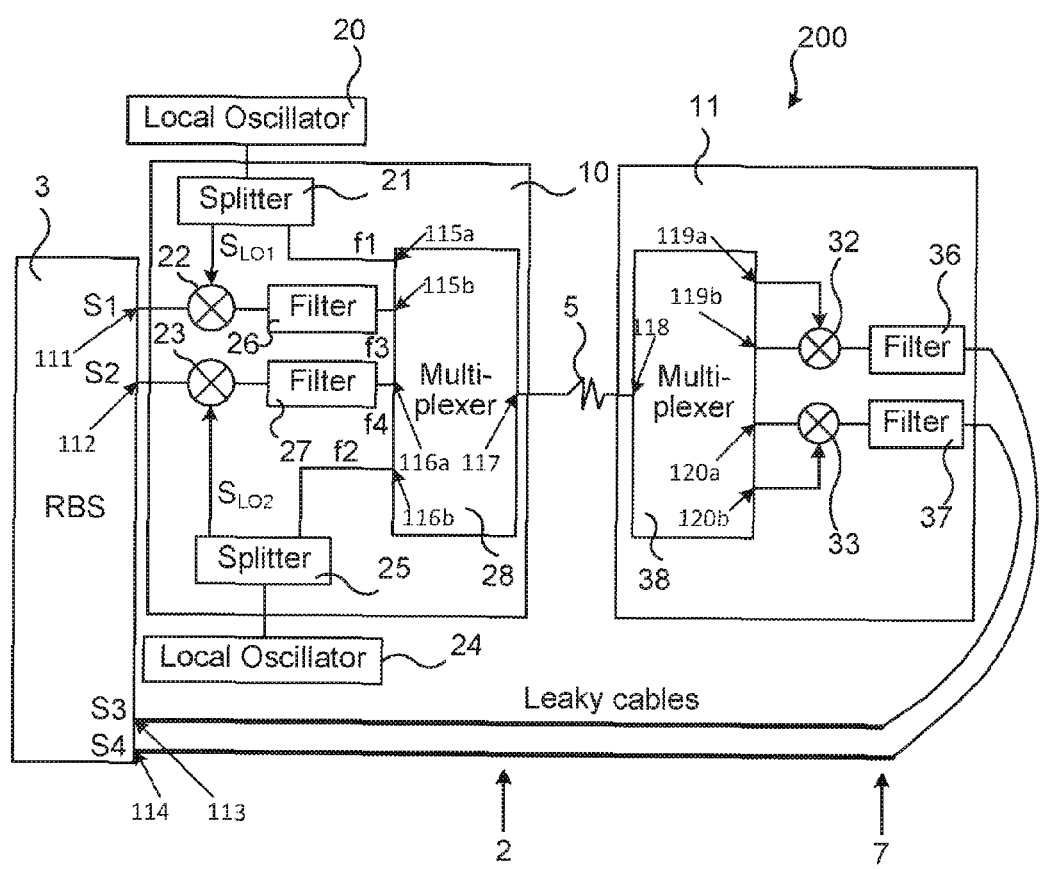
FIG. 3 illustrates the second embodiment of the present disclosure in some more detail.
Figure 4:
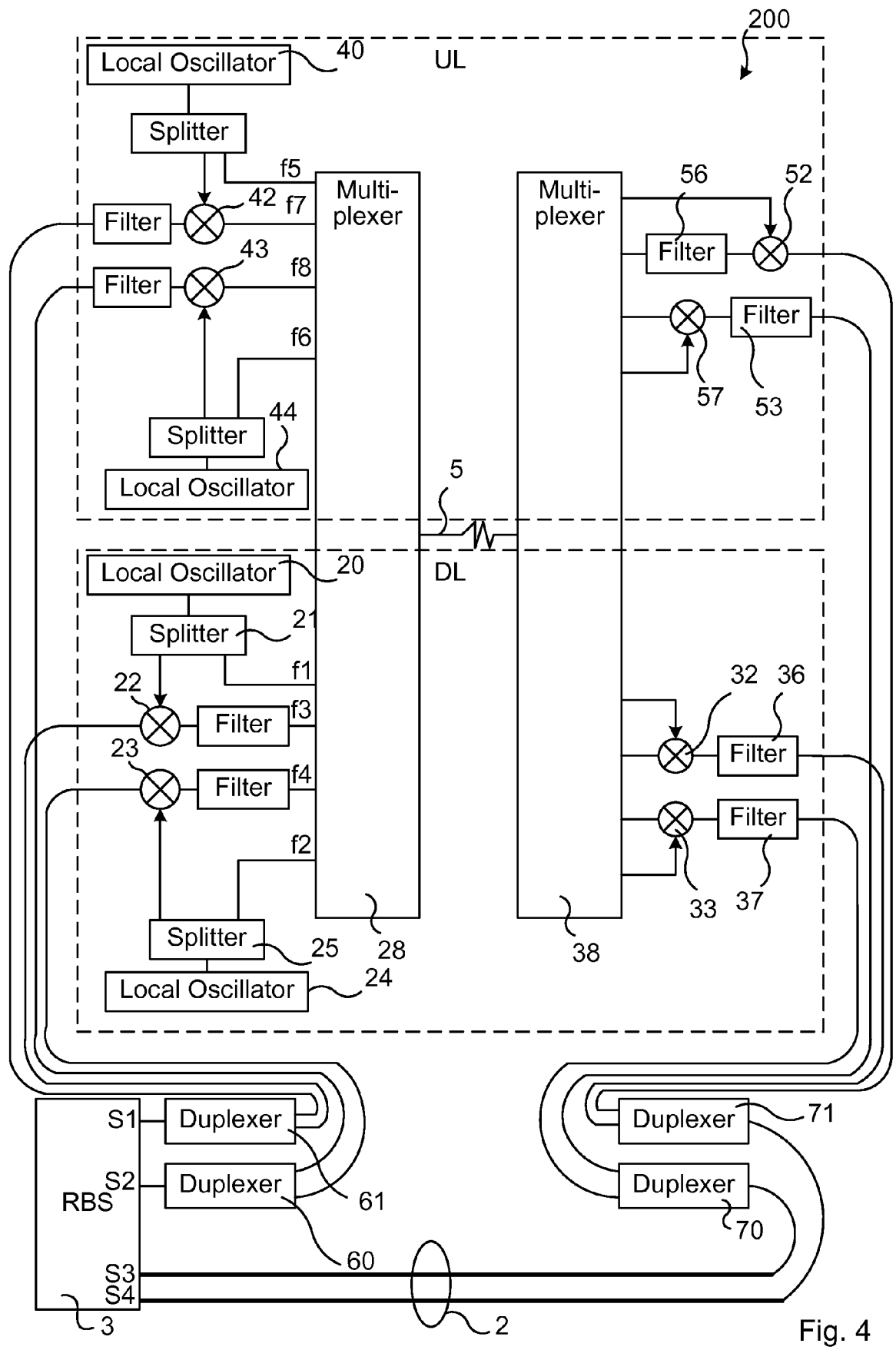
FIG. 4 illustrates a third embodiment of the present disclosure.

FIG. 3 illustrates the embodiment described in FIG. 2 more in detail. For simplicity, in the example of FIG. 3 only four streams are used instead of eight and only for downlink. The principles described may be extended to the 8×8 MIMO illustrated in FIG. 2, and for both uplink and downlink (an example of which is illustrated in FIG. 4).

Streams S3 and S4 are fed to the leaky cables 2, in conventional manner, via antenna ports 113 and 114, respectively; compare description of such conventional manner provided in relation to FIG. 1. S3 and S4 thus correspond to streams to/from a first set of antenna ports sensed/fed in leaky cables 2 in conventional manner and will not be described more in detail.

S1 and S2 are streams from (as downlink will be described in the following) a second set of antenna ports of the network node 3 (i.e., antenna ports 111 and 112, respectively). This second set of antenna ports (i.e., antenna ports 111 and 112) are feeding the leaky cables 2 at their far ends 7, as well as sensing the leaky cables 2 at their far ends 7 (again compare description provided in relation to FIG. 1). When sending a stream S1, S2 downlink the streams S1 and S2 are frequency converted into two new frequencies $f_3$ and $f_4$ by using a respective mixer 22, 23. The mixer signals are located at the frequencies f1 and f2 and come from a respective local oscillator 20, 24. Before the respective mixer signals enter the respective mixers 22, 23 they are divided in two parts by using a respective splitter 21, 25. One of the two parts of each mixer signal is then transported along the cable 5 to the far end 7 of the cable 5. At the far end of the cable 5 the mixer signals are used in two respective passive mixers 32, 33 to frequency convert the two streams S1, S2 back to their original frequency.

Thus, describing the above more in detail and only for one of the streams: S1 is frequency converted into another frequency (i.e. other than its original frequency), in the following denoted second frequency f3. The original signal S1 may for example be converted into an intermediate frequency, for later multiplexing of several signals over the single cable 5, which is connected at one end to port 117 of multiplexer 28 and which is connected at the other end to port 118 of multiplexer 28. The second frequency f3 is created by mixing, in a first mixer 22, the original signal S1 with a first LO-signal $S_{LO1}$, which first LO-signal $S_{LO1}$ is provided from a first local oscillator 20. The first mixer 22 thus outputs the second frequency $f_3$ which may be filtered, as illustrated at a first filter 26, before input to a second port 115b of multiplexer 28 of the multiplexing device 10 and multiplexed onto the cable 5 for transmission.

The first LO-signal $S_{LO1}$ provided by a first local oscillator 20 is input to a first splitter 21 before it is input to the first mixer 22. The first LO-signal $S_{LO1}$ is thus split in the first splitter 21, the first part of which is input to the first mixer 22, and the second part of which is input to the multiplexer 28 via first port 115a of multiplexer 28. This second part of the split first LO-signal $S_{LO1}$ is transported along the cable 5 to the second multiplexer 38 (as is shown in FIG. 3), and in particular to a demultiplexer thereof. The second part of the split LO-signal $S_{LO1}$ is output from port 119a of the multiplexer 38 and input to a first passive mixer 32, which is then able to frequency convert the second frequency $f_3$ back to the original signal S1, which second frequency $f_3$ is output from port 119b of the multiplexer 38 and received by a second input to passive mixer 32. The original signal S1 may then be filtered, as illustrated by a third filter 36, before fed into the leaky cable 2 at its far end 7.

For sake of completeness, also the second stream is described in the following, although the above description is applicable also to this stream. Thus, stream S2 is frequency converted into another frequency (i.e. other than its original frequency), in the following denoted third frequency $f_4$. The original signal S2 may for example be converted into an intermediate frequency, for later multiplexing of several signals over the single cable 5. The third frequency $f_4$ is created by mixing, in a second mixer 23, the original signal S2 with a second LO-signal $S_{LO2}$, which second LO-signal $S_{LO2}$ is provided from a second local oscillator 24. The second mixer 23 thus outputs the third frequency $f_4$ which may be filtered, as illustrated at a second filter 27, before input to port 116a of the multiplexer 28 of the multiplexing device 10 and multiplexed onto the cable 5 for transmission.

The second LO-signal $S_{LO2}$ provided by the second local oscillator 24 is input to a second splitter 25 before it is input to the second mixer 23. The second LO-signal $S_{LO2}$ is thus split in the second splitter 25, the first part of which is input to the second mixer 23, and the second part of which is input to the multiplexer 28 via port 116b of multiplexer 28. This second part of the split second LO-signal $S_{LO2}$ is transported along the cable 5 to the second multiplexer 38, and in particular to the demultiplexer thereof. The second part of the split second LO-signal $S_{LO2}$ is output from the demultiplexer of multiplexer 38 (i.e., output from port 120b of multiplexer 38) and input to a second passive mixer 33, which is then able to frequency convert the third frequency $f_4$, which is received by mixer 33 from port 120a of multiplexer 38, back to the original signal S2. The original signal S2 may then be filtered, as illustrated by a fourth filter 37, before fed into the leaky cable 2 at its far end 7.

FIG. 4 illustrates the embodiment of FIG. 3, but illustrating use of both uplink and downlink. The description provided in relation e.g. to FIGS. 2 and 3 are applicable also for FIG. 4, in particular for downlink. The uplink works in a way corresponding to the described downlink, which uplink processing will be described next for sake of completeness.

S1 and S2 are streams received (as uplink will be described in the following) in the leaky cables 2 and provided to the second set of antenna ports of the network node 3. An uplink signal S1 is sensed at the far ends 7 of the leaky cables 2, provided to a fifth mixer 52, and possibly filtered in a fifth filter device 56. The uplink signal S1 is mixed in the fifth mixer 52 with a third local oscillator signal LO-signal $S_{LO3}$ from a third local oscillator 40 and provided over the interconnecting cable 5 as described earlier. The fifth mixer 52 thus provides a signal frequency converted into another frequency (i.e. other than the original frequency of uplink signal S1), and inputs this signal to a multiplexer 38. The original signal S1 may for example be converted into an intermediate frequency, for later multiplexing of several signals over the single cable 5. The multiplexer 38 multiplexes the frequency converted uplink signal S1 onto the cable 5 for transmission to the network node 3. The multiplexer 28 demultiplexes the uplink signal S1 and a sixth mixer 42 frequency converts it back to the frequency of the originally received uplink signal S1, which may thus be provided to the network node 3. A second uplink signal S2 is processed in corresponding manner using a seventh mixer 53, a seventh filter device 57, and a seventh mixer 43 and a fourth local oscillator 44. It is noted that the fifth and seventh mixers 52, 53 may thus be passive mixers.

It is noted that the arrangement 200 may be implemented with only two local oscillators, one local oscillator 20, 40 providing an oscillator signal for uplink and downlink processing for one antenna port of the second set of antenna ports, and one local oscillator 24, 44 providing an oscillator signal for uplink and downlink processing for another antenna port of the second set of antenna ports. That is, either one of the first local oscillator 20 and the third oscillator 40 could be used thus removing one of them. Likewise, either one of the second local oscillator 24 and fourth local oscillator 44 could be used thus removing one of them. In such case, the frequency f1 indicated in the figure is equal to f5, and f2 is equal to f6.

The uplink and downlink signals are thus processed in corresponding manner, and further details for the uplink signals will not be given herein. In FIG. 4, duplexers 60, 61, 70, 71 are illustrated. A first duplexer 60 is for the uplink and downlink for the first stream S1 and a second duplexer 61 is for the uplink and downlink for the second stream S2. The first and second duplexers 60, 61 are connected between the second set of antenna ports and a third multiplexing device 48 and the first multiplexing device 28, respectively. A third duplexer 70 and a fourth duplexer 71 are correspondingly provided connected between the far ends 7 of the leaky cables 2 and the second multiplexing device 38. The use of duplexers 60, 61, 70, 71 enables bi-directional (duplex) communication over the single cable 5, i.e. uplink and downlink simultaneously.

The loss in the cable 5 can be quite low, for example around 3-4 dB/loom. However, an amplifier (not illustrated) may nevertheless be used, to increase the signal at the far end thereof.

Cyclic prefix in radio access technologies, such as Long Term Evolution (LTE), makes sure that signals traveling different paths and therefore arriving at the receiving node at different times could be demodulated without inter-symbol interference. The maximum difference in paths that a signal can travel depends on the length of the cyclic prefix. In LTE, the length difference of different paths could be several hundreds of meters long without experiencing any inter-symbol interference. This means that the cables of the present disclosure could be several hundreds of meters long. By using extended cyclic prefix the length of the cable can be even longer.

If power supply (not illustrated) is needed in the far end 7 of the leaky cables 2, such power may be fed over the leaky cables 2 from the network node 3 end.

It is noted that although the disclosure has been described mainly with reference to providing communication coverage over elongated areas (such as tunnels), embodiments of the disclosure may be applied in other scenarios as well.

The features of the various embodiments may be combined in different ways. An arrangement 100, 200 may thus be provided comprising a network node 3 and one or more leaky cables 2 connected at a first end 6 thereof to a respective antenna port of a first set of antenna ports of the network node 3. The network node 3 is configured to provide wireless communication for a communication device 4. The arrangement 10 further comprises: a first multiplexing device 8, 10 connected to antenna ports of a second set of antenna ports of the network node 3, a second multiplexing device 9, ii connected to the one or more leaky cables 2 at a second end 7 thereof, an interconnecting cable 5, interconnecting the first multiplexing device 8, 10 and the second multiplexing device 9, ii, wherein: the first multiplexing device 8, 10 is arranged to frequency convert signals received from the second set of antenna ports and multiplex them into the interconnecting cable 5, and arranged to demultiplex signals received from the interconnecting cable 5 and to frequency convert signals for processing by the network node 3, and wherein the second multiplexing device 9, 11 is arranged to frequency convert signals received on the one or more leaky cables 2 and multiplex them into the interconnecting cable 5, and arranged to demultiplex signals received from the interconnecting cable 5 and to frequency convert signals for transmission on the one or more leaky cables 2.

The first multiplexing device 8, 10 is in particular arranged to demultiplex the signals received from the interconnecting cable 5 and frequency convert the signals back to their original frequency, and the being processed by the network node 3. Correspondingly, the second multiplexing device 9, ii is in particular arranged to demultiplex the signals received from the interconnecting cable 5 and frequency convert the signals back to their original frequency before being fed to the leaky cables 2.

In an embodiment, the arrangement 100, 200 comprises a local oscillator 20, 24 arranged to provide a local oscillator signal $S_{LO1}$, $S_{LO2}$ to the first multiplexing device 8, 10. In this embodiment, the first multiplexing device 8, 10 is arranged to multiplex the local oscillator signal $S_{LO1}$, $S_{LO2}$ onto the interconnecting cable 5. This embodiment enables the use of passive frequency converters at the second end 7 of the leaky cables 2 (i.e. the end located furthest away from the network node 2). The use of passive frequency converters at the second end 7 of the leaky cables 2 in turn enables the use of only passive components in the multiplexing device 11 at the second end 7 of the leaky cables 2. As only passive components thus need to be used at the second end 7 of the leaky cables 2 there is no need for a monitoring system at the far ends of the leaky cables 2, which provides a more cost efficient solution in view of both installation and maintenance.

In a variation of the above embodiment, the arrangement 100, 200 comprises a passive mixer 32, 33, wherein the second multiplexing device 9, 11 is arranged to demultiplex the local oscillator signal $S_{LO1}$, $S_{LO2}$ and output it to the passive mixer 32, 33. The passive mixer 32, 33 is arranged to frequency convert the signals sent over the interconnecting cable 5 back to the original frequency of the signals from the one or more antenna ports of the second set of antenna ports by means of the local oscillator signal $S_{LO1}$, $S_{LO2}$ for transmission on the one or more leaky cables 2.

In variations of the above two embodiment, the arrangement 100, 200 comprises, for each respective antenna port of the second set of antenna ports, a respective local oscillator 20, 24, 40, 44 and a respective mixer 22, 23, 42, 43, wherein each mixer 22, 23, 42, 43 is arranged to frequency convert a signal from its corresponding antenna port by mixing it with a local oscillator signal from its corresponding local oscillator 20, 24, 40, 44.

In a variation of the above embodiment, the arrangement 100, 200 comprises, for each respective antenna port of the second set of antenna ports, a respective local oscillator 20, 24 and a respective mixer 22, 23 for downlink and comprising, for each respective antenna port of the second set of antenna ports, a respective local oscillator 40, 44 and a respective mixer 42, 43 for uplink. In another variation, only two local oscillators are provided; one local oscillator 20, 40 providing an oscillator signal for uplink and downlink processing for one antenna port of the second set of antenna ports, and one local oscillator 24, 44 providing an oscillator signal for uplink and downlink processing for another antenna port of the second set of antenna ports.

In an embodiment, the number of antenna ports of the first set of antenna ports is equal to the number of antenna ports of the second set of antenna ports. Each leaky cable connected to the antenna ports may thus be fed/sensed from both ends thereof.

The invention claimed is:

1. An apparatus comprising a network node and one or more leaky cables connected at a first end thereof to the network node, the network node being configured to provide wireless communication for a communication device, the apparatus further comprising:
   a first multiplexer connected to the network node,
   a second multiplexer connected to the one or more leaky cables at a second end thereof,
   an interconnecting cable, interconnecting the first multiplexer and the second multiplexer, wherein:
   the first multiplexer is arranged to frequency convert first and second signals received from the network node and multiplex them into the interconnecting cable, and arranged to demultiplex signals received from the interconnecting cable and to frequency convert signals for processing by the network node, and
   the second multiplexer is arranged to frequency convert signals received on the one or more leaky cables and multiplex them into the interconnecting cable, and arranged to demultiplex signals received from the interconnecting cable and to frequency convert signals for transmission on the one or more leaky cables.

2. The apparatus of claim 1, further comprising an oscillator apparatus arranged to provide first and second oscillator signals to the first multiplexer, wherein
   the first multiplexer is arranged tom multiplex the first and second local oscillator signals onto the interconnecting cable.

3. The apparatus of claim 2, comprising a passive mixer, wherein the second multiplexer is arranged to demultiplex the first and second local oscillator signals and output them to the passive mixer, the passive mixer being arranged to frequency convert the signals sent over the interconnecting cable back to the original frequency of the first and second signals by means of the first and second oscillator signals for transmission on the one or more leaky cables.

4. The apparatus of claim 2, further comprising a first local oscillator and a first mixer and a second local oscillator and a second mixer, wherein the first mixer is arranged to frequency convert the first signal by mixing it with a local oscillator signal from the first local oscillator and the second mixer is arranged to frequency convert the second signal by mixing it with a local oscillator signal from the second local oscillator.

5. The apparatus of claim 4, further comprising a third mixer for mixing a first and a second signal from the second multiplexer and a fourth mixer for mixing a third and a fourth signal from the second multiplexer.

6. An apparatus for communicating wirelessly with a wireless communication device, the apparatus comprising:
   a radio base station (RBS);
   a first multiplexor comprising: a first multiplexor port connected to a first mixer that is configured to receive a first signal (S1) output by the RBS; a second multiplexor port connected to a second mixer that is configured to receive a first signal (S1) output by the RBS; and a third multiplexor port connected to a cable, wherein the first multiplexer is configured to generate a multiplexed signal comprising a third signal received at the first multiplexor port and a fourth signal received at the second multiplexor port and output the multiplexed signal into the cable via the third multiplexor port;
   a second multiplexor comprising: a fourth multiplexor port connected to a third mixer that is connected to a first end of a first leaky cable; a fifth multiplexor port connected to a fourth mixer that is connected to a first end of a second leaky cable; and a sixth multiplexor port connected to the cable, wherein the second multiplexor is configured to demultiplex the multiplexed signal and output the third signal via the fourth multiplexor port and output the fourth signal via the fifth multiplexor port.

7. The apparatus of claim 6, wherein
   the first multiplexor port is connected to the first mixer via a first filter,
   the second multiplexor port is connected to the second mixer via a second filter,
   the fourth multiplexor port is connected to the third mixer via a third filter, and the fifth multiplexor port is connected to the fourth mixer via a fourth filter.

8. The apparatus of claim 7, wherein
a second end of the first leaky cable is directly connected to the radio base station, and
a second end of the second leaky cable is directly connected to the radio base station.

* * * * *